United States Patent [19]

Drakesmith et al.

[11] Patent Number: 5,545,390
[45] Date of Patent: Aug. 13, 1996

[54] PROCESS FOR THE DESTRUCTION OF HALOCARBONS

[75] Inventors: Frederick G. Drakesmith, Mold; Andrew R. Jones, Wrexham, both of United Kingdom

[73] Assignees: EA Technology Limited; Manweb PLC, both of Chester, United Kingdom

[21] Appl. No.: 379,458
[22] PCT Filed: Aug. 5, 1993
[86] PCT No.: PCT/GB93/01656
§ 371 Date: Mar. 30, 1995
§ 102(e) Date: Mar. 30, 1995
[87] PCT Pub. No.: WO94/03237
PCT Pub. Date: Feb. 17, 1994

[30] Foreign Application Priority Data

Aug. 6, 1992 [GB] United Kingdom .................. 9216666

[51] Int. Cl.$^6$ ........................................................ C01D 3/16
[52] U.S. Cl. ...................... 423/499.1; 423/499.4; 423/DIG. 12; 588/201; 588/206
[58] Field of Search ..................... 588/206, 201; 423/DIG. 12, 240 R, 499.1, 499.4

[56] References Cited

U.S. PATENT DOCUMENTS

| 4,392,888 | 7/1983 | Eckert et al. | 75/68 R |
| 4,755,628 | 7/1988 | Adams | 585/469 |

OTHER PUBLICATIONS

Pytlewski, L. L. et al., *U.S. Environ. Prot. Agency. Off Res. Dev.*, 1980, 72–6 (abstract only).

*Primary Examiner*—Michael Lewis
*Assistant Examiner*—Amy M. Harding
*Attorney, Agent, or Firm*—Beveridge, DeGrandi, Weilacher & Young, L.L.P.

[57] ABSTRACT

A process for the destruction of a halocarbon, which process comprises reacting the halocarbon with molten sodium at an elevated temperature to produce the corresponding sodium halide or halides in a sludge in the molten sodium and separating the sludge from the molten sodium.

8 Claims, 1 Drawing Sheet

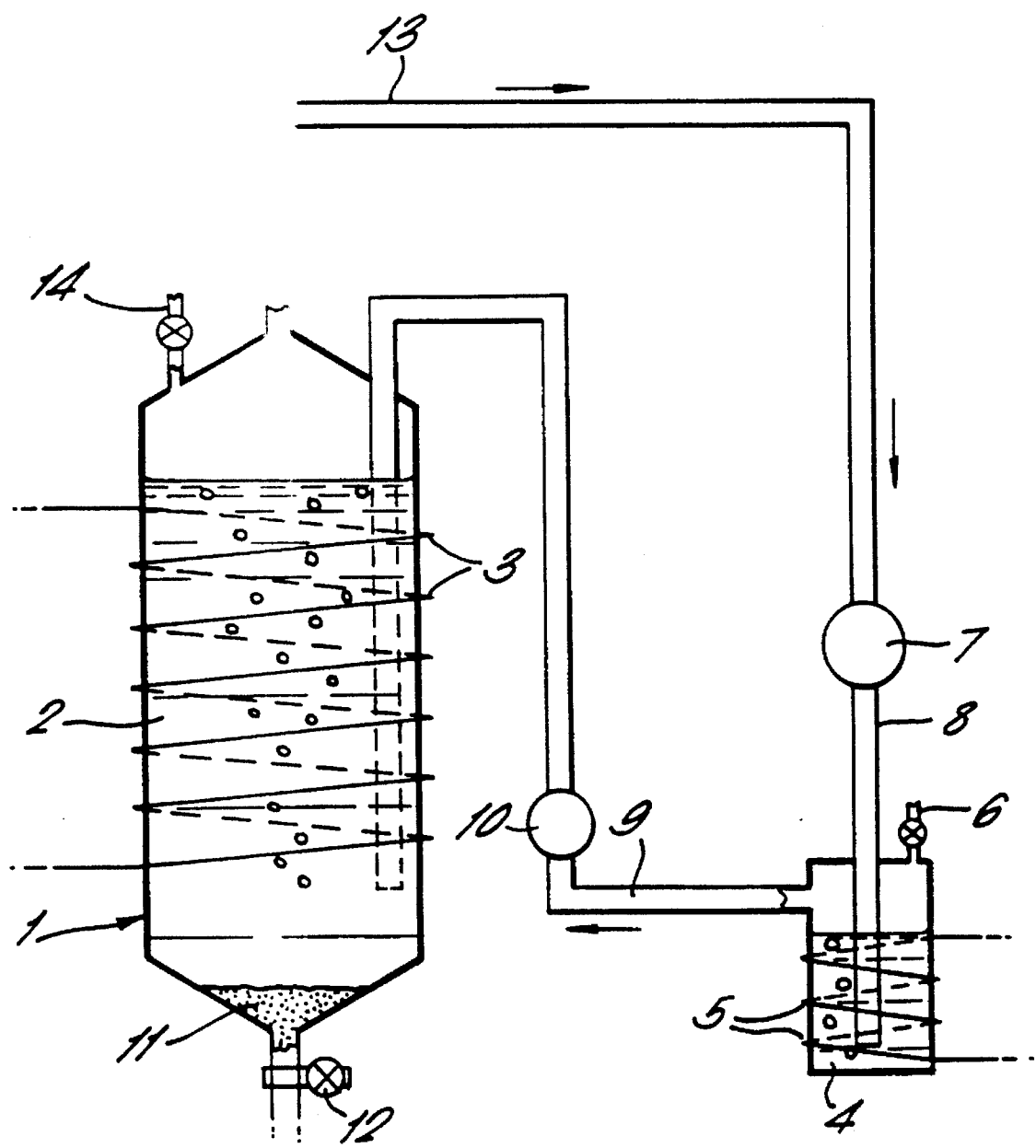

PROCESS FOR THE DESTRUCTION OF HALOCARBONS

The present invention relates to a process for the destruction of halocarbons.

World wide concern over the depletion of ozone in the upper atmosphere has led to stringent international measures covering the production and use of halocarbons, particularly chlorofluorocarbons (CFCs) used in refrigeration, foam blowing, aerosols, etc. Intense work in the developed world is being targetted towards the search for some "ozone friendly" alternative compounds for use in these applications. However, considerable quantities of CFCs are presently "locked-up" in existing equipment. As this equipment comes to the end of its useful life there would be great value in being able to extract the CFCs and destroy the material in a process which would remove the halocarbons from the atmosphere.

We have now developed a process in which halocarbons are converted from materials with a high ozone depletion potential into stable solid phase compounds.

Accordingly, the present invention provides a process for the destruction of a halocarbon, which process comprises reacting the halocarbon with molten sodium at an elevated temperature to produce the appropriate sodium halide or halides in the solid phase.

The reaction of the present invention is surprising since it would have been predicted that a very violent, if not explosive reaction, would occur when the halocarbon contacted the molten sodium.

The process of the present invention, although specifically designed to address the chlorofluorocarbon problem, could also be used to treat a wide range of other halocarbons, such as dry cleaning fluids, degreasing fluids, polychlorobiphenyls, etc.

In carrying out the process of the present invention, the molten sodium is maintained at a temperature in the range of from 98° to 500° C., preferably at a temperature in the range of from 200° to 300° C.

The halocarbon which is to be destroyed in the present invention may be bubbled through the molten sodium, or may be admixed with an inert gas, such as, nitrogen, helium or argon.

The halocarbon to be treated according to the process of the present invention is preferably bubbled from a reservoir through the molten sodium, for example by introducing the gas into the bottom of a reaction vessel containing molten sodium.

The halocarbons react with the molten sodium to produce solid products each of which is denser than molten sodium. The products therefore tend to sink to the base of the reactor from which they are preferably removed, unless the reaction mixture is stirred vigorously when the products will tend to stay on top of the molten sodium. The densities and melting points of the various species involved are given below.

|  | Density | Melting Point °C. |
|---|---|---|
| Sodium | 0.97 | 97.8 |
| Sodium Bromide | 3.203 | 747 |
| Sodium Chloride | 2.165 | 801 |
| Sodium Floride | 2.557 | 993 |
| Carbon | 1.8–2.2 | 3600 |

A typical process is, for example, the destruction of dichlorodifluoromethane (R12), a typical domestic refrigerant, which reacts according to the following equation:

$$CCl_2F_2 + 4Na \rightarrow C + 2NaCl + 2NaF.$$

The products of the process of the present invention are solid, dry products which are easily separable from the molten sodium. The products are, furthermore, valuable e.g. the carbon produced is in finely divided form with a very high surface area and is useful as a catalyst carrier or absorbent, etc. Should the treated halocarbon contain a bromine atom the resultant bromide products so produced may be readily converted into elemental bromine. Because no aqueous products are formed in the reaction, the process is particularly suitable for use as an environmentally friendly method for the destruction of ozone depleting volatile halocarbons.

The present invention will be described by way of a specific example thereof with reference to the single Figure of the accompanying drawings which illustrates an appartus for carrying out the process.

Referring to the drawing, a reaction vessel 1 is filled with molten sodium 2. The molten sodium is held at a temperature above the melting point thereof, i.e. above 98° C. by means of a coil heater 3 which surrounds the column of the reaction vessel. The halocarbon which is to be treated according to the invention is contained in a reservoir 4 which is cooled by means of a cooler 5 through which a coolant flows in order to maintain the halocarbon liquid. The reservoir 4 is provided with a tap 6 for the introduction of a further supply of halocarbon thereto. An inert gas is pumped by means of pump 7 along line 8 into the halocarbon reservoir. The bottom of line 8 is immersed in the liquid halocarbon and as the inert gas bubbles from the tube the halogen compound is vapourized. The concentration of the halocarbon which is mixed with the inert gas stream will depend upon the vapour pressure of the halocarbon and the flow rate of the inert gas stream along line 8. The mixture of halocarbon and inert gas passes along line 9 via a one way valve 10 to the reactor 1. Line 9 enters reactor 1 close to the bottom thereof and the mixture of inert gas/halocarbon bubbles through the molten sodium during which time the halocarbon reacts with the molten sodium in order to form sodium halides and carbon. The sodium halides and carbon produced according to the process settled to the bottom of the reactor as a sludge 11. Periodically the sludge 11 will be removed from reactor 1 by opening tap 12. After passage through the molten sodium 2 the inert gas, essentially freed from the halocarbon vapour, leaves reactor 1 via a loop line 13 which joins line 8 via pump 7. Periodically, it will be necessary to top up the level of sodium contained in reactor 1 and the sodium may be introduced into the top of the reactor through an inlet port 14.

The present invention will be further described with reference to the following Examples.

EXAMPLE 1

Reaction of R-12 ($CF_2Cl_2$) with Molten Sodium

A 500 cm³ 4-necked flanged flask equipped with a gas inlet, sealed stirrer unit, thermometer and an outlet open to the atmosphere (via two spiral cold glass traps, two oil bubblers and a silica gel moisture trap) was charged with sodium metal (123.05 g, 5.35 g-atom). The flask was immersed in an oil bath and heated to 146° C. The R-12 gas ($CF_2Cl_2$) was bled into the stirred molten sodium via a calibrated flowmeter so that the amount could be regulated and monitored at any given time, and any escape of the gas could be noticed by watching the oil bubbler.

The R-12 flowrate was initially at 8 cm³/min for 1 hr; after this time a black layer appeared on the top of the silvery metal (R-12=1.65 g, 13.6 mmol; 76 mins). The flowrate was then increased to 14 cm³/min for 1 hr, during which period although occasional bubbles in the oil-filled trap were noticed from time to time, no material condensed in the cold traps. The amount of the black powdery layer (in addition to other lighter-coloured solids) kept forming on the top of the molten metal (R-12=5.15 g, 42.6 mmol; 60 mins). Finally, the flow-rate was increased to 30 cm³/min for 20 mins; this caused the rate of production of the bubbles in the oil-filled lute to be increased to 120/min in comparison to 4–10/min in the previous stage. The flowrate was so great that some of the carbon powder produced was swept into the traps; and the unreacted R-12 escaped uncondensed (R-12=2.30 g, 19 mmol; 20 mins).

| The Mass Balance | | | | |
|---|---|---|---|---|
| Input | | (g) | Output | (g) |
| T. | reaction flask | 939.95 | | |
| G. | reaction flask | 1063.00 | G. reaction flask | 1070.60 |
| N. | Sodium metal | 123.05 | | |
| | R-12 Stage 1 | 1.65 | | |
| | R-12 Stage 2 | 5.15 | | |
| | R-12 Stage 3 | 2.30 | | |
| | R-12 total | 9.10 | mass increased 84% conversion | 7.60 |

The reaction was slightly exothermic due to the heat exchange with the oil bath.

EXAMPLE 2

Reaction of 1301 CF₃Br) with Molten Sodium

A 1000 cm³ 5-necked flanged flask equipped with a gas inlet, sealed stirrer unit, thermometer and an outlet open to the atmosphere (via two oil bubblers) was charged with sodium metal (189.50 g, 8.24 g-atom). The flask was immersed in an oil bath and heated to 121° C. The 1301 gas (CF₃Br) was bled into the stirred molten sodium via a calibrated flowmeter so that the amount could be regulated and monitored at any given time, and any escape of the gas could be noticed by watching the oil bubbler.

The flowrate of the 1301 was increased gradually and no diluent was employed. Firstly, the gas 1301 was admitted at a rate of 5 cm³/min; after approximately 30 mins a black layer appeared on the top of the silvery metal. After a total of 40 mins the flowrate was increased to 8 cm³/min for 30 mins, during which period the amount of the black powdery layer (in addition to other lighter-coloured solids) continued to form on the top of the molten metal. The flowrate was then increased to 20 cm³/min for 30 mins, subsequently to 33 cm³/min (30 mins.), to 48 cm³/min (10 mins) and finally to 55 cm³/min (10 mins). During the whole time the 1301 gas reacted completely with the molten sodium and no appearance of the gas in the exit line was noticed at any time. The reaction was slightly exothermic. The stirring was vigorous and effective in such a way that the upper part of the anchor stirrer was acting as a centrifuge towards the solid products which accumulated on top of the molten sodium; a certain amount of solid product was observed to sink near the walls of the glass reactor.

| Mass Balance | | | |
|---|---|---|---|
| Input | (g) | Output | (g) |
| Tare wt. reaction flask | 1011.85 | | |
| Gross wt. reaction flask | 1201.34 | Gross wt. reaction flask | 1217.45 |
| Net wt. Sodium metal | 189.50 | | |
| 13B1 total | 16.16 | mass increase 99.8% conversion of CF₃Br to products | 16.11 |

We claim:

1. A process for the destruction of a halocarbon, which process comprises reacting the halocarbon with sodium characterised in that the halocarbon in gaseous form is bubbled through a bath formed of molten sodium at a temperature in the range from 98° to 500° C. to produce the corresponding sodium halide or halides in a sludge in the molten sodium and separating the sludge from the molten sodium.

2. A process as claimed in claim 1 wherein the halocarbon is a chlorofluorocarbon.

3. A process as claimed in claim 1 wherein the molten sodium is maintained at a temperature in the range of from 200° to 300° C.

4. A process as claimed in claim 1 wherein the halocarbon is admixed with an inert gas.

5. A process as claimed in claim 4 wherein the halocarbon is carried from a reservoir in a stream of inert gas and the mixture of halocarbon/inert gas is bubbled through the molten sodium.

6. A process as claimed in claim 4 wherein the halocarbon or the mixture of halocarbon/inert gas is introduced into the bottom of a reaction vessel containing the molten sodium.

7. A process as claimed in claim 1 wherein the solid phase products produced in the reaction mixture are separated from the molten sodium.

8. A process as claimed in claim 1, said process consisting essentially of reacting halocarbon with sodium wherein said halocarbon in gaseous form is bubbled through a bath formed of molten sodium at a temperature in the range from 98° to 500° C. to produce the corresponding sodium halide or halides in solid phase.

* * * * *